July 31, 1962     E. A. DAHLE     3,047,099
CONSTANT TORQUE DRUM BRAKE

Filed Nov. 17, 1958     2 Sheets-Sheet 1

INVENTOR.
Edwin A. Dahle
BY
His Attorney

July 31, 1962 E. A. DAHLE 3,047,099
CONSTANT TORQUE DRUM BRAKE
Filed Nov. 17, 1958 2 Sheets-Sheet 2

INVENTOR.
Edwin A. Dahle
BY
D C Staley
His Attorney

United States Patent Office 3,047,099
Patented July 31, 1962

3,047,099
CONSTANT TORQUE DRUM BRAKE
Edwin A. Dahle, Dayton, Ohio, assignor to General Motors Corporation, Detroit, Mich., a corporation of Delaware
Filed Nov. 17, 1958, Ser. No. 774,504
4 Claims. (Cl. 188—78)

This invention relates to a vehicle brake and more particularly to a device within a vehicle brake for providing a constant torque on the drum brake.

The conventional vehicle drum brake which employs two shoes and a single hydraulic means between two cooperating adjacent brake shoe ends for actuating these two shoes and a connecting strut between the opposite cooperating adjacent ends, has unequal braking on the one shoe in relation to the other. The friction on the primary shoe creates a force which is applied to the secondary shoe which, when combined with the original applying force, creates a greater resultant force on the secondary shoe. This greater force caused by the frictional forces on the primary shoe may vary in relation to the coefficient of friction. The variation may be due to such things as heat, moisture, impurities, and type of friction material used. The result of this changing resultant force on the secondary shoe will create an undesirable change in the torque output of the brake.

It is an object of this invention to provide a compensating device operating within the vehicle brake to provide a smooth operating and constant torque vehicle drum brake.

It is another object of this invention to provide means whereby the input force for actuating the brakes on the primary shoe may be reduced as the braking torque of the secondary shoe increases.

It is a further object of this invention to provide an increasing component of force on the primary shoe as the braking torque of the secondary shoe decreases.

It is a further object of this invention to provide a lever system which acts as an anchor means for the shoes of a vehicle drum brake.

It is a further object of this invention to provide a device for maintaining a constant torque output of a vehicle drum brake by hydraulic means. A hydraulic cylinder provides an anchor means for the entire output of the drum brake.

It is a further object of this invention to provide an input force applied to the primary shoe which varies inversely to the coefficient of friction of friction material in a vehicle drum brake.

The objects of this invention are accomplished by a hydraulic means and also a mechanical lever system. The lever system is employed with a vehicle brake including a drum and two cooperatively engaging brake shoes. The ends of these two brake shoes operatively engage each other through an adjusting strut between two of the cooperating ends. Between the other two cooperating ends of the brake shoes, a hydraulic wheel cylinder is positioned. A permanent anchor means is also disposed between these two cooperating ends of the brake shoes. This anchor means engages the ends of the brake shoes by a notch in the end of the primary and a slot in the secondary shoes.

In the mechanical version using a lever system as an anchor means, a push rod is connected to the end of the secondary shoe which operates against a lever. This lever pivots about an anchor lug which is mounted on the backing plate of the brake. The opposite end of this lever operates against a cleat which is placed on the brake piston rod which operates the primary brake shoe. As the wheel cylinder is actuated, opposing forces are created on the primary and secondary brake shoes. The force on the primary shoe engages the shoe with the drum of the vehicle brake. The friction from primary shoe engagement against the rotating brake drum causes a torque which is transmitted through the adjusting strut on the two co-operating ends between the primary and secondary brake shoe. A resultant force on the secondary shoe applied through the connecting strut and from the wheel cylinder piston rod causes a brake applying force on the secondary shoe. Also, a rotative torque is transmitted to the push rod and lever. This force is transmitted through the push rod which actuates the lever pivoting on the anchor lug. As the lever is pivoted, the opposite end of the lever creates an opposing force on the primary wheel cylinder piston through a cleat on the piston rod. By this means the original actuating force on the primary brake shoe is reduced and the operating torque of the braking means is also reduced. The reverse situation is true when a decrease in the amount of force is being applied to the push rod. The compensating force on the cleat of the wheel cylinder rod operating the primary brake shoe is decreased. This mechanism tends to provide a balancing means within the vehicle brake and a constant torque output of the brake, although the coefficient of friction in the brake varies.

This same compensating means is provided in a hydraulic device. This device also uses the conventional vehicle brake comprising a brake drum, two actuating shoes, and an adjustable strut between two of the cooperating ends of said brake shoes. A hydraulic wheel cylinder is also employed to actuate this brake. The hydraulic cylinder is anchored to the backing plate of the brake and also included within the wheel cylinder casting is an additional cylinder. The second or the anchor cylinder is placed radially outwardly from and parallel to the first or the actuating cylinder. The casting of this cylinder has a portion which serves as an anchor and engages the anchor end of the primary brake shoe. The cooperating or anchor end of the secondary shoe engages a piston rod which is connected to the piston operating in the anchor cylinder. The anchor cylinder also contains a valve which controls as passage between the wheel cylinder and the anchor cylinder. When a sufficient amount of force is created on the secondary shoe, this force is applied to the piston rod of the anchor cylinder. This creates a pressure within the cylinder forcing fluid through a passage into a cylinder chamber of reduced area on the opposite side of the wheel cylinder piston. The chamber is in the same casting and is concentrically in line with the main or wheel cylinder. It, however, has a smaller fluid area and is effective in reducing the actuating force on the primary shoe. By this means, as the output force from the secondary shoe is carried through to the anchor cylinder, this, in turn, reduces the effective force on the primary shoe and thereby reduces the torque output of the brake. As the force from the secondary brake shoe decreases, the pressure within the cylinder chamber also decreases and thereby the actuating force on the primary shoe becomes greater.

Both of these devices have the same reverse braking characteristics. The brakes operate as a conventional brake as the wheel cylinder is actuated. In the case of the hydraulic device, only the pressure within the wheel cylinder operates the brakes since the anchor piston travel is limited by a stop.

Further objects and advantages of the present invention will be apparent from the following description, reference being had to the accompanying drawings wherein preferred embodiments of the present invention are clearly shown.

In the drawings:

FIG. 1 is a cross-section view of the constant torque vehicle brake illustrating a lever system. The brake is shown in an inoperative position.

FIG. 2 discloses the same lever system wherein the brake is in an operating position.

Figure 1:
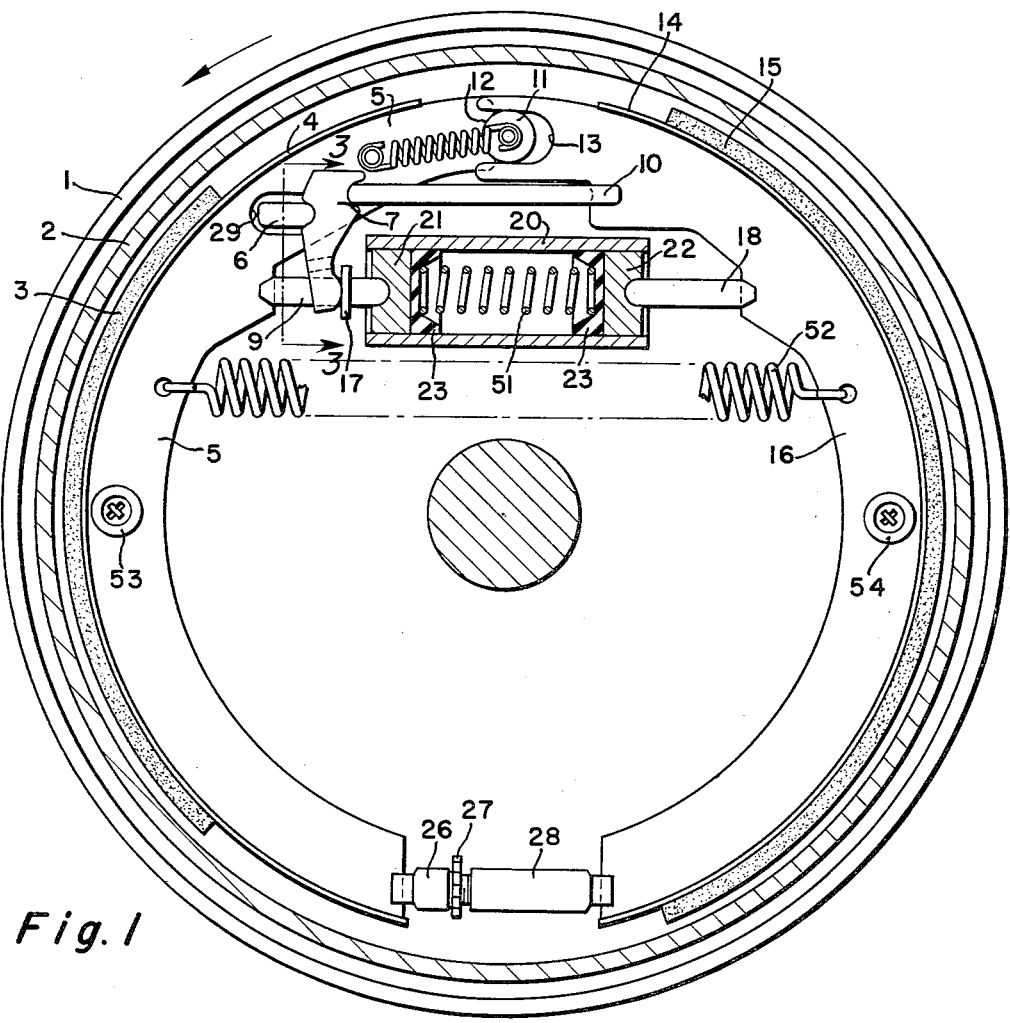
Figure 2:
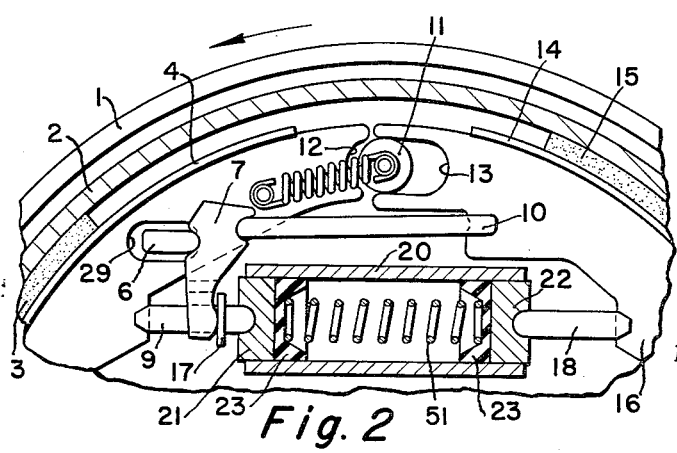
Figure 3:
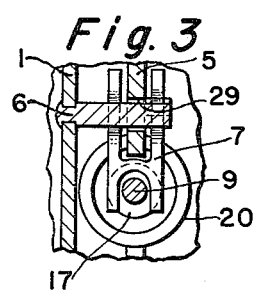
FIG. 3 is a cross-section view as shown by the arrows 3—3 of FIG. 1.

FIG. 1 discloses the brake employing the linkage system for controlling brake torque. A drum brake is used in conjunction with this compensating device. A brake drum 2 is mounted adjacent the backing plate 1. A locating pin 11 is mounted on the backing plate and is positioned between the two cooperating ends of the primary shoe 4 and the secondary shoe 14. An anchor lug 6 is also fastened to the backing plate 1 and extends through a perforation 29 in the primary brake shoe web 5. The primary brake shoe 4 is provided with a friction material 3 for engaging the brake drum 2. The secondary brake shoe 14 is provided with a friction material 15 for engaging a brake drum 2. An adjusting device is disposed between the cooperating ends of the primary and secondary brake shoe webbing 5 and 16. A tension spring 52 is positioned between shoe webbing 5 and 16 and guide members 53 and 54 support the shoe webbing. The sleeve member 26 is slotted on its end to receive the primary brake shoe 5. A ratchet wheel 27 is fastened to a screw member to provide adjustment of the brake shoes. The threaded member threadedly engages a hollow cylindrical member 28. The hollow cylindrical member 28 is threaded on its inner periphery and has a groove on its outward end for engaging the secondary brake shoe 16.

The locating and anchoring means of the vehicle brake is pin 11 and the anchor lug 6. The locating pin 11 is positioned between the two cooperating ends of the primary and the secondary brake shoe webbing 5 and 16. A notch 12 is located in the end of the primary shoe webbing 5. This notch fits around the periphery of pin 11. A notch 13 is also provided on the secondary brake shoe webbing 16. This notch is somewhat deeper than notch 12 on the brake shoe and allows for movement of the secondary shoe upon actuation of the brakes. The sides of this groove 13 fit along the outer periphery of pin 11 to restrain the movement of the brake shoe. The anchoring means is the anchor lug 6 which extends through the primary brake shoe webbing 5. A lever 7 pivots on this anchor lug. A push rod 10 actuates the pivoting of lever 7 as it bears against the outer end of this lever. The opposite end of push rod 10 is slotted for engaging the cooperating end of the secondary brake shoe webbing 16. The lever 7 pivots at its center and the opposite end operates against a cleat 17 which is mounted on the piston rod 9. The piston rod 9 is also grooved on its end to receive the webbing 5 of the primary brake shoe 4. The opposite end of the wheel cylinder is also provided with a rod 18 which is slotted on its end to receive the webbing 16 of the secondary brake shoe 14. The wheel cylinder 20 is mounted on the backing plate 1. Two pistons 21 and 22 operate within this wheel cylinder against spring 51. Two seals 23 are disposed on the ends of the pistons 21 and 22.

The linkage push rod 10, lever 7 and cleat 17 on rod 9 operate as an anchoring means for the cooperating end of the secondary brake shoe webbing 16. This linkage system provides an anchor and a pivoting action on the anchor lug 6. It is this pivoting action that provides a control means for constant torque output of the hydraulic brake. The lever 7 is placed so that it straddles the webbing 5 of the primary shoe and the primary actuating rod 9.

Figure 4:
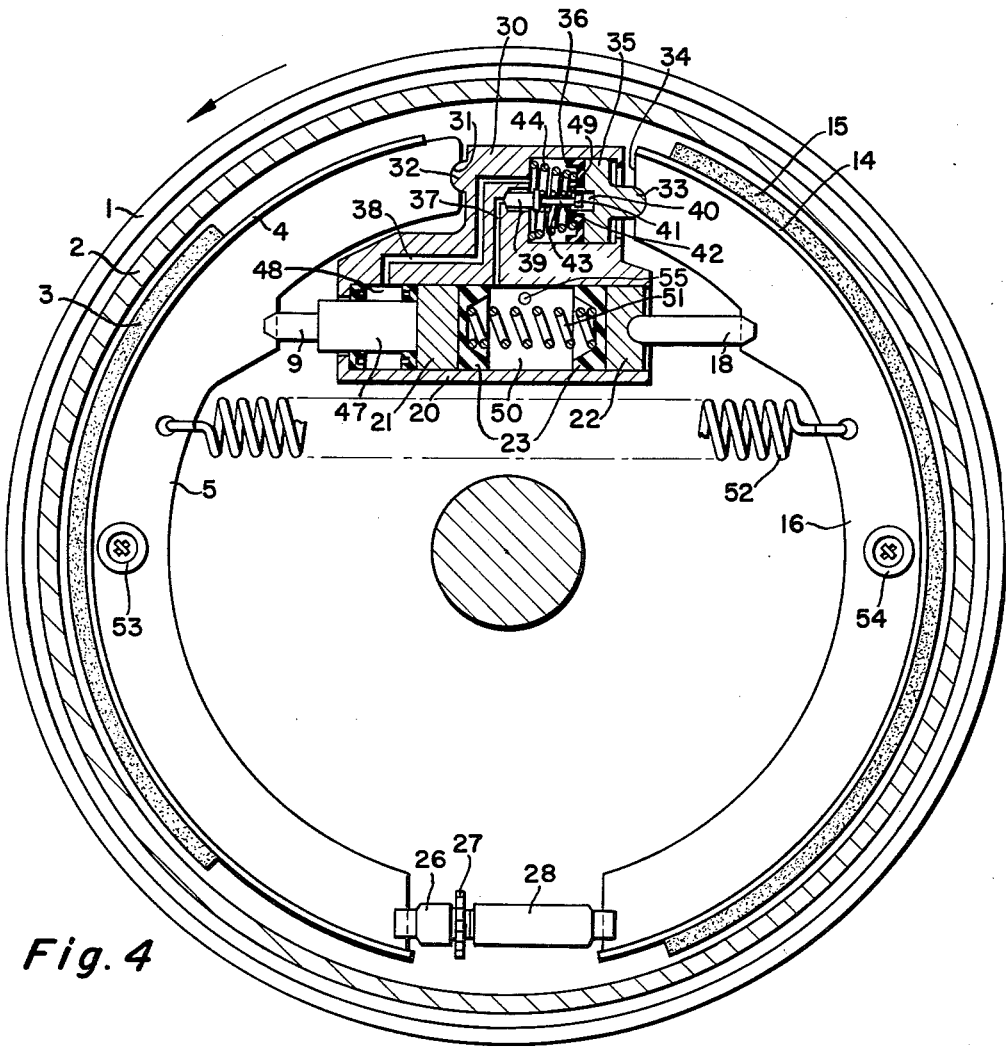
FIG. 4 is a cross-section view of the constant torque vehicle brakes illustrating a hydraulic device. The brake is shown in an inoperative position.

The hydraulic compensating device of FIGURE 4 operates to perform the same function as the mechanical linkage device. The structure, however, is somewhat different. A single casting is used for the cylinders 20 and 30. The cylinder 20 is the main wheel cylinder. The piston 22 connected to a rod 18 operates the secondary brake shoe. The rod 18 operates on the webbing 16 of the secondary brake shoe. The primary piston 21 of the wheel cylinder 20 operates the primary brake shoe by contacting the primary shoe webbing 5. Both of these pistons within the cylinder 20 are provided with a seal 23. The rod 9, as it extends inwardly into the cylinder 20, has an enlarged diameter. The area within cylinder 20 about the outer periphery of the enlarged rod 47 provides a differential fluid chamber in which an opposing force is created. This opposing force created within cylinder 20 provides for the compensating means in the braking device. Fluid chamber 48 is connected by means of a passage 38 to a cylinder 30. An additional passage is provided from the anchor cylinder 30 to provide communication between this anchor cylinder and the wheel cylinder fluid chamber 50 of cylinder 20 having a fluid inlet 55 thereto. A valve 39 is placed on the inlet of this passage 37. This valve is spring biased to a closed position by spring 43. A second spring 44 is also mounted within the anchor cylinder which operates against the seal 36 and piston 35 and tending to force and hold the piston 35 to an outward or extended position. The piston 35 has an inner chamber 40 for receiving the head 41 of a pin 42 which is directly connected to valve 39. This chamber provides for movement of valve 39 in allowing fluid to pass through passages 37 and 38. If an excess amount of fluid is allowed to enter into the cylinder 30, a means is provided for opening the valve as the piston moves into extended position in relation to the cylinder 30. This means is shown by a lip 49 on the inner edge of chamber 40. This lip 49 engages the head 41 of pin 42 as piston 35 is extended. The piston 35 is provided with a rod 33 for engaging the cooperating end 34 of the secondary brake shoe webbing 16. The casting of the anchor cylinder 30 adjacent the primary brake shoe webbing 5 is also provided with a projection 32 for positioning the primary brake shoe end 31 of brake shoe webbing 5.

This hydraulic compensating means is used in conjunction with an adjusting strut between the opposite cooperating ends of the brake shoes. This adjusting member comprises a sleeve member 26, a threaded member connected to a ratchet member 27 which engages an internally threaded cylindrical member 28. The compensating or feedback device operates to provide a constant torque output on the vehicle brake. The operation of the lever system shown in FIG. 1 is hereinafter described.

As a force through fluid pressure is applied within the hydraulic cylinder 20, the pistons 21 and 22 are extended within the cylinder 20. The rod 18 forces against the secondary shoe webbing 16 and the rod 9 forces against the primary shoe webbing 5. Upon increased pressure within the cylinder the pistons 21 and 22 are extended until the friction material 3 on the primary brake shoe 4 and the friction material 15 on the secondary shoe 14 engage the brake drum 2. At this point there is equal force and equal frictional braking of both shoes. However, a friction on the primary and secondary shoes creates a torque which tends to rotate the brake shoes. The friction on the primary shoe 4 creates an additional force or torque force transmitted through the primary brake shoe web 5 to the adjusting strut. The force is conveyed through the adjusting strut members 26 and 28 to the secondary shoe webbing and thereby provides a force against the secondary shoe 14. This force puts a greater application force on the secondary shoe and greater friction is thereby caused between the surface of the friction material 15 and the drum 2. As the secondary shoe tends to rotate about the center of the vehicle brake, the webbing 16 forces the push rod 10 against the lever 7. The lever 7 pivots about the anchor lug 6 and, in turn, forces the cleat 17 inward against the piston 21. This counteracting force on the cleat 17 and piston 21 relieves the input force through the rod 9. As the input force on rod 9 is decreased, the resultant force applied to the secondary shoe 14 is also decreased. It is apparent that if the coefficient of friction on the primary and secondary shoe linings might be varied due to factors beyond the control of the operator of the vehicle, the operation of the brakes may also vary and cause erratic operation of the brakes. This inherent shortcoming of this type of a brake may be eliminated by a lever device of this type. It is also shown that the brake will function in reverse braking as a conventional brake. The wheel cylinder 20 expands the two pistons 21 and 22 to apply the brakes. The compensating device is not used in reverse braking. The pin 11 operates as an anchor means in reverse braking and the lever is inoperative.

Figure 5:
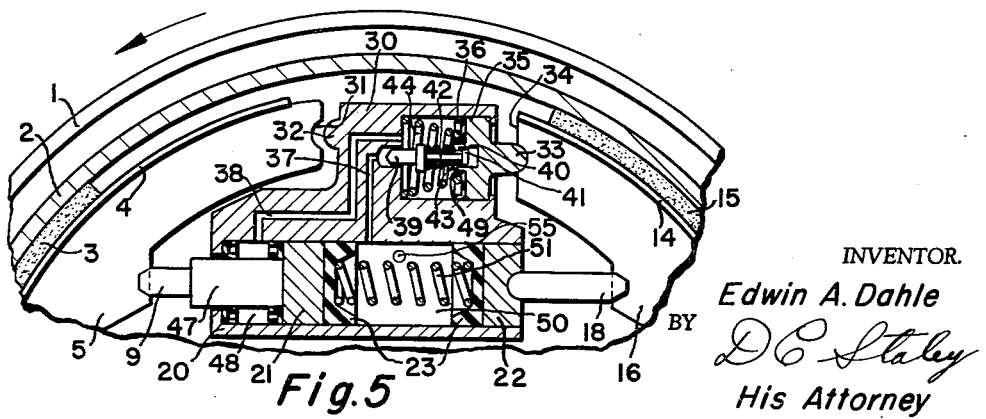
FIG. 5 is also a cross-section view using the same hydraulic means, but the brake is in an operating position and the control valve is open.

The hydraulic compensating structure is shown in FIG. 4 and operates to perform the same function as the mechanical linkage as shown in FIG. 1. As fluid enters chamber 50 through inlet 55 the wheel cylinder 20 is actuated, the pistons 21 and 22 extend outward and the rods 18 and 9 force the brake shoes outward. At the same time, piston 35 moves to the extended position shown in FIGURE 5 as fluid is displaced from chamber 48 to the chamber in anchor cylinder 30 through conduit 38 and as the lip 49 of the piston 35 contacts the head 41 of valve 39, the valve will be opened and the conduit to chamber 50 opened. As the friction material 3 of the primary brake shoe 4 and the friction material 15 of the secondary brake shoe 14 contact the drum, the outward force exerted against both brake shoes at this instant is equal. Upon frictional engagement of the frictional material of the primary brake shoe 4 with the brake drum 2, a torque is created which tends to rotate the primary brake shoe against the secondary brake shoe. This torque on the primary brake shoe is applied to the secondary brake shoe through the adjusting strut members 26 and 28. The secondary brake shoe also being in frictional contact with the brake drum 2 tends to rotate within the brake drum. This force is applied on the anchor piston rod 33 and forces the anchor piston 35 into the anchor cylinder 30. The valve 39 is then closed and the fluid is forced out through passage 38 into the compensating chamber 48. As additional fluid is forced through the passage 38, the pressure within the compensating chamber 48 is increased and thus the force on the rod 9 connecting to the primary brake shoe is decreased. As the force on the primary brake shoe is decreased, the resultant force through the anchor cylinder 30 by means of the hydraulic fluid is also decreased. This action tends to compensate for variations in friction of the primary and secondary brake shoe linings and provides for smoother and more constant operation of the vehicle brake.

The reverse braking characteristic of this brake is also the same as that of a conventional duo-servo brake. As a hydraulic wheel cylinder 20 is actuated, the rods 9 and 18 are extended forcing the friction material 15 of the secondary brake shoe 14 and the friction material 3 of the primary brake shoe 4 outwardly against the drum 2. The brake shoes tend to rotate within the brake drum but the rotation is blocked by means of the projection 32 on the primary side of the casting of the hydraulic cylinder 30 which serves as the anchor means in reverse braking for notch 31 of the primary shoe.

While the embodiments of the present invention as herein disclosed constitute a preferred form, it is to be understood that other forms might be adopted.

What is claimed is as follows:

1. A vehicle brake including a torque regulating device comprising in combination, a brake support member, a brake drum rotatably mounted adjacent to said brake support member, a primary brake shoe, a secondary brake shoe, said brake shoes mounted on said brake support member for frictionally engaging said brake drum, means connecting two ends of said brakes shoes, hydraulic fluid actuating and anchor means mounted on said brake support member including, a hydraulic wheel cylinder, a primary piston in said wheel cylinder connected to said primary brake shoe, a secondary piston in said wheel cylinder connected to said secondary brake shoe, a fluid actuating cylinder formed by said pistons and said wheel cylinder, a compensating chamber formed by said primary piston and said wheel cylinder, a portion of said primary piston extending through said compensating cylinder to reduce the effective area exposed to hydraulic fluid in said compensating chamber relative to said actuating chamber, an anchor cylinder connected to said hydraulic cylinder, an anchor piston in said anchor cylinder connected to said secondary brake shoe, an anchor chamber formed by said anchor piston and said anchor cylinder, valve means in said anchor chamber, means for biasing said valve means to a closed position, conduit means connecting said actuating chamber through said anchor chamber to said compensating chamber, and said valve means in said conduit means intermediate said actuating chamber and said anchor chamber operating in response to pressure in said anchor chamber and controlling the communication between said actuating chamber and said compensating chamber through said anchor chamber to reduce the torque input to said primary shoe in response to the torque output of said secondary brake shoe as reflected by pressure in said anchor chamber to provide a constant input actuating force on said primary brake shoe when said vehicle brakes are actuated.

2. A vehicle brake including a torque regulating device comprising in combination, a brake support member, a primary brake shoe, a secondary brake shoe, said brake shoes mounted on said support member for frictionally engaging said brake drum, means connecting two ends of said brake shoes, hydraulic fluid actuating and anchor means connected to said brake support member including, a hydraulic wheel cylinder, a secondary piston operating within said wheel cylinder connected to said secondary brake shoe, a primary piston operating within said hydraulic wheel cylinder connected to said primary brake shoe, an actuating chamber formed by said pistons and said hydraulic wheel cylinder, a compensating chamber formed by said primary piston and said hydraulic wheel cylinder co-axial with said actuating chamber, a portion of said primary piston extending through said compensating chamber forming a reduced effective area exposed to hydraulic fluid in said compensating chamber relative to said actuating chamber, an anchor cylinder connected to said hydraulic wheel cylinder, an anchor piston operating within said anchor cylinder connected to said secondary shoe, an anchor chamber formed by said anchor cylinder and said anchor piston and pressurized in accordance with torque output of said secondary shoe, valve means in said anchor chamber, means for biasing said valve means to a normally closed position, conduit means connecting said actuating chamber with said compensating chamber through said anchor chamber in controlled communication through said valve means, said anchor piston pressurizing fluid in said anchor chamber and said compensating chamber in response to torque output to increase an opposing force on said primary piston in opposition to the actuating force on said primary piston to reduce the input force on said primary brake shoe in direct proportion to the output force from said secondary shoe when said vehicle brakes are actuated.

3. In a hydraulic brake, a torque regulating device comprising: a backing plate; a brake drum rotatably mounted adjacent to said backing plate; a primary shoe; a secondary shoe, said shoes engaging said brake drum and having cooperative adjacent ends; an adjustable strut connecting two of said cooperative adjacent ends; a first fluid cylinder mounted on said backing plate and having a first piston disposed therein and cooperating with one end thereof to define a first fluid chamber and a second piston disposed therein and cooperating therewith and with said first piston to define an actuating fluid chamber; a second fluid cylinder rigidly connected to said first cylinder and having a third piston disposed therein and cooperating therewith to define a second fluid chamber and operating against said secondary shoe; a rod connecting said first piston to said primary shoe; first passage means connecting said first fluid chamber with said second fluid chamber; second passage means connecting said second fluid chamber with said actuating fluid chamber; a closeable valve in said second passage means and provided for thereby controlling fluid pressure in said second fluid chamber and thus to vary effective input force on said primary shoe as torque on said secondary shoe changes.

4. In a constant torque brake, the combination of a backing plate, a primary and a secondary shoe, a brake drum, said shoes positioned for engagement with said drum and having adjacent cooperative ends, an adjusting strut connecting two adjacent ends, a first hydraulic cylinder operatively positioned between the opposite cooperative adjacent ends of said brake shoes, two pistons operating within said first cylinder forming an actuating chamber therebetween, one of said two pistons operatively connecting the secondary shoe by means of a rod and operating in one end portion of said cylinder, the other of said two pistons operating adjacent the other end portion of said cylinder and spaced a distance from the opposite end of said cylinder, a first fluid chamber formed by a reduced area on said other piston and the adjacent end of said cylinder, a second hydraulic cylinder rigidly connected to said first cylinder and said backing plate and having a piston therein and defining a second fluid chamber therewith, said last named piston being connected with and operating against said secondary shoe, fluid passage means connecting said actuating chamber with said first fluid chamber through said second fluid chamber, valve means in said fluid passage means and responsive to fluid pressure in said second fluid chamber for controlling the flow of fluid between said second fluid chamber and said actuating chamber, the pressurization of fluid in said second fluid chamber being responsive to the varying torque output from said secondary shoe and thereby controlling the effective input force on said primary shoe as the torque on said secondary shoe changes.

References Cited in the file of this patent

UNITED STATES PATENTS

| 2,382,268 | Stelzer | Aug. 14, 1945 |
| 2,818,941 | Berno | Jan. 7, 1958 |

FOREIGN PATENTS

| 1,149,905 | France | July 29, 1957 |